(12) United States Patent
Veerasamy et al.

(10) Patent No.: US 7,964,821 B2
(45) Date of Patent: *Jun. 21, 2011

(54) WINDOW WITH DE-ICING FEATURE AND METHOD

(75) Inventors: Vijayen S. Veerasamy, Ann Arbor, MI (US); Daniel F Prone, Trenton, MI (US); Scott V. Thomsen, South Lyon, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 299 days.

This patent is subject to a terminal disclaimer.

(21) Appl. No.: 12/149,640

(22) Filed: May 6, 2008

(65) Prior Publication Data

US 2008/0203079 A1 Aug. 28, 2008

Related U.S. Application Data

(63) Continuation of application No. 11/176,677, filed on Jul. 8, 2005, now Pat. No. 7,518,093.

(51) Int. Cl.
*B60L 1/02* (2006.01)
*H05B 6/62* (2006.01)

(52) U.S. Cl. ........ 219/203; 219/202; 219/772; 219/773; 219/628; 219/764

(58) Field of Classification Search .................. 219/772, 219/628, 764, 773, 202, 203
See application file for complete search history.

(56) References Cited

U.S. PATENT DOCUMENTS

| | | | |
|---|---|---|---|
| 3,678,889 A | 7/1972 | Murakami et al. | |
| 4,095,228 A | 6/1978 | Meinke et al. | |
| 4,864,316 A | 9/1989 | Kaoru et al. | |
| 4,987,289 A | 1/1991 | Bishop et al. | |
| 5,285,048 A | 2/1994 | Nakase | |
| 5,408,069 A | 4/1995 | Mischel, Jr. | |
| 6,027,075 A | 2/2000 | Petrenko | |
| 6,204,480 B1 | 3/2001 | Woodard et al. | |
| 6,268,594 B1 | 7/2001 | Leutner et al. | |
| 6,472,636 B1 | 10/2002 | Baldwin | |
| 6,653,598 B2 | 11/2003 | Petrenko et al. | |
| 6,723,971 B1 * | 4/2004 | Petrenko et al. | 219/770 |
| 6,832,742 B2 | 12/2004 | Petrenko et al. | |
| 6,847,024 B2 * | 1/2005 | Petrenko | 219/770 |
| 6,870,139 B2 | 3/2005 | Petrenko | |
| 6,995,339 B2 * | 2/2006 | Schwartz et al. | 219/202 |
| 7,518,093 B2 | 4/2009 | Veerasamy | |
| 2002/0092849 A1 | 7/2002 | Petrenko | |

OTHER PUBLICATIONS

U.S. Appl. No. 11/176,677, filed Jul. 8, 2005 (Veerasamy et al.).

* cited by examiner

*Primary Examiner* — Shawntina Fuqua
(74) *Attorney, Agent, or Firm* — Nixon & Vanderhye P.C.

(57) ABSTRACT

A window such as a vehicle window (e.g., windshield) has a de-icing feature. In certain example embodiments, a conductive structure is provided on an interior surface of a substrate of the window, AC tuned to an ice removal frequency is caused to run through the conductive structure, and fields generated by the AC passing through the conductive structure propagate through the substrate to an exterior surface of the window and can be absorbed by ice thereby causing the ice to melt and/or be removed from the window.

14 Claims, 3 Drawing Sheets

WINDOW WITH DE-ICING FEATURE AND METHOD

This application is a continuation of Application Serial No. 11/176,677, filed Jul. 8, 2005 now U.S. Pat. No. 7,518,093, the entire content of which is hereby incorporated herein by reference in this application.

This invention relates to a window, such as a vehicle window (e.g., windshield) having a de-icing features. In certain example embodiments, a conductive structure is provided on an interior surface of a substrate of the window, AC (Alternating Current) tuned to an ice removal frequency is caused to run through the conductive structure, and fields generated by AC passing through the conductive structure propagate through the substrate to an exterior surface of the window and can be absorbed by ice thereby causing the ice to melt and/or be removed from the window.

BACKGROUND OF THE INVENTION

Ice tends to build up on the exterior surfaces of vehicle windows in winter months. Ice build-up may be caused by snow, freezing rain, sleet, or the like in different instances. Ice impairs a vehicle driver's ability to adequately see through a vehicle window such as a windshield. Thus, it would be desirable to provide vehicle windows with an ice removal feature.

De-icing structures for vehicle windows are known in the art. For example, see U.S. Pat. No. 6,027,075, the disclosure of which is hereby incorporated herein by reference. Unfortunately, the de-icing grid structure of the '075 patent is provided on the exterior surface of the vehicle window, and thus is easily susceptible to damage caused by the environment (e.g., corrosion and/or physical damage). Moreover, exposed electrodes which may be touched by persons are not desirable.

In view of the above, there exists a need in the art for a window (e.g., vehicle window) that is provided with an ice-removal structure or feature that is not entirely provided on the exterior surface of the window.

BRIEF SUMMARY OF EXAMPLE EMBODIMENTS OF THE INVENTION

In certain example embodiments of this invention, a window such as a vehicle window (e.g., windshield) is provided with a de-icing feature/structure. In certain example embodiments, a conductive structure such as one or more electrodes is provided on an interior surface of a substrate of the window. Then, AC (Alternating Current) tuned to an ice removal frequency is caused to run through the conductive structure, and fields generated by the AC passing through the conductive structure propagate through the substrate (e.g., glass substrate of the window) to an exterior surface of the window and can be absorbed by ice thereby causing the ice to melt and/or be removed from the window. In other words, once the de-icing circuit is driven with AC, electromagnetic energy from the circuit is coupled to ice on the exterior surface of the window. This electromagnetic energy is absorbed by the ice thereby causing ice removal from the window.

In certain example embodiments, it has been found that an AC frequency tuned to ice removal is from about 5-40 kHz, more preferably from about 10-25 kHz, and most preferably from about 10-20 kHz. It has surprisingly been found that the use of AC at this frequency causes generation of electromagnetic energy that is most efficiently absorbed by ice on the exterior of the window, thereby resulting in the most efficient ice removal. A sine wave and/or square wave type of AC may be used in different example embodiments of this invention.

In certain example embodiments of this invention, there is provided a method of de-icing a vehicle windshield, the windshield comprising an exterior glass substrate and an interior glass substrate that are laminated to one another via at least a polymer inclusive interlayer, the method comprising: providing at least one conductor on an interior surface of the exterior glass substrate; applying AC at a frequency of from about 5 to 40 kHz to the conductor on the interior surface of the exterior glass substrate, so that electromagnetic energy caused by application of the AC to the conductor propagates through the exterior glass substrate and is absorbed by ice on an exterior surface of the vehicle windshield thereby causing the ice to melt and/or be removed from the vehicle windshield.

In other example embodiments of this invention, there is provided a window including a de-icing structure, the window comprising: an exterior substrate and an interior substrate spaced apart from one another; at least one conductor provided on an interior surface of the exterior substrate; and an AC power source for applying AC at a frequency of from about 5 to 40 kHz to the conductor on the interior surface of the exterior substrate so that electromagnetic energy caused by application of the AC to the conductor is coupled to ice on an exterior surface of the exterior substrate thereby causing the ice to melt and/or be removed from the window.

DETAILED DESCRIPTION OF EXAMPLE EMBODIMENTS THE INVENTION

Figure 1:
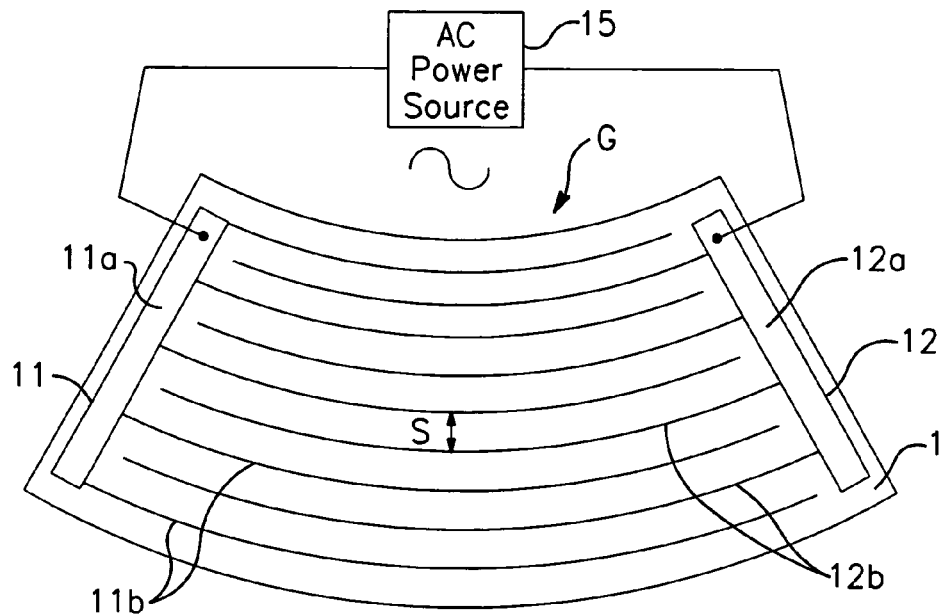
FIG. 1 is a schematic diagram of a vehicle window (e.g., windshield) including a de-icing feature according to an example embodiment of this invention.

Referring now more particularly to the accompanying drawings in which like reference numerals indicate like parts throughout the several views.

Figure 2:
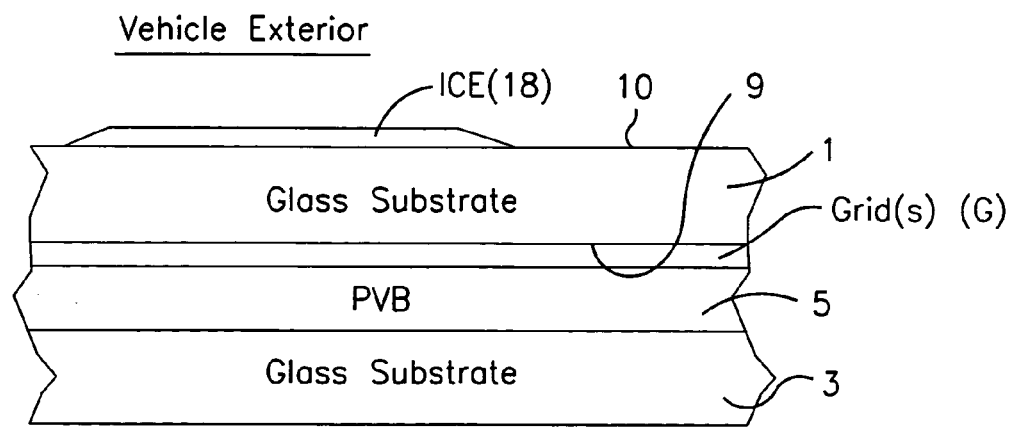
FIG. 2 is a cross sectional view of the window of FIG. 1.

FIGS. 1-2 illustrate an example window (vehicle windshield in this example case) according to an example embodiment of this invention, where FIG. 1 is a schematic diagram and FIG. 2 is a cross sectional view of the window of FIG. 1. The vehicle window of FIGS. 1-2 includes first and second opposed glass substrates 1 and 3 with a polymer-based laminating interlayer (e.g., PVB or the like) 5 provided therebetween. Glass substrate 1 is the outer glass substrate of the windshield located adjacent the exterior of the vehicle, whereas glass substrate 3 is the interior glass substrate of the windshield located adjacent the vehicle interior. The glass substrates 1 and 3 may be perfectly flat, or bent, in different example embodiments of this invention, and are often heat treated (e.g., thermally tempered and/or heat strengthened). Windshield or window may have a visible transmission of at least about 60%, more preferably of at least about 70%, and sometimes at least 75%, in certain example embodiments of this invention.

The ice removal structure of the FIG. 1-2 embodiment includes comb-shaped conductors 11 and 12, which include conductive bus bars 11a and 12a, respectively. The comb-shaped conductors 11 and 12 further include conductive comb teeth 11b and 12b, respectively, which extend across a viewing area of the window from the bus bars. The conductors (or electrodes) 11 and 12 may be provided directly on and contacting the surface of the glass substrate 1 in certain example embodiments of this invention, although in alternative embodiments other layers (e.g., dielectric layer or layers such as silicon nitride or the like) may be provided between the substrate 1 and the conductors. In making up conductive grid G across a central and/or viewing area of the window, moving from top to bottom or vice versa across the window, the comb teeth 11b from the conductor 11 alternate with the comb teeth 12b from the conductor 12 as shown in FIG. 1 in certain example embodiments of this invention. Comb teeth 11b and 12b may be formed of any suitable wiring material to make up a conductive grid G, with silver, gold, or the like being example conductive materials. Conductors 11 and 12 may be formed of like materials, which may be the same or different than their respective teeth portions. The gap between the teeth of conductors 11 and 12 acts as a capacitor, and waves may oscillate back and forth between the two comb-shaped conductors.

In certain example embodiments, the conductors 11 and 12 may form a capacitive part of the ice removal circuit. An inductor or choke may be used to provide a resonant circuit with broad enough Q factor. When ice 18 is present on the exterior surface of the window the circuit picks up an extra resistive component with the enhanced capacitive load of the ice. This allows energy to be dissipated into the ice and permits the melting of the ice 18. Such an ice mounting circuit may also contain an ice and/or water sensing mechanism that may automatically allow energy to be delivered from the power source 15 to the circuitry when ice and/or water is detected as being present.

FIG. 2 illustrates that the conductive grid G formed by the interspersed conductors (or electrodes) 11 and 12 is formed on the interior surface 9 of glass substrate 1 (i.e., on the interior surface of the exterior substrate 1). Thus, the conductive grid G made up of conductors 11 and 12 is protected from the surrounding environment exterior the vehicle by glass substrate 1, and is protected from the environment inside the vehicle by interior glass substrate 3 and polymer interlayer 5. Thus, the conductive grid G cannot be easily damaged, and cannot be readily touched by persons in or around the vehicle.

In certain example embodiments of this invention, a window such as a the vehicle window (e.g., windshield) of FIGS. 1-2 is provided with de-icing feature/structure including grid G including conductors 11, 12 and AC power source 15 electrically connected to the conductors 11, 12. The conductive structure including electrodes 11 and 12 is provided on an interior surface 9 of glass substrate 9. From AC power source 15, AC tuned to an ice removal frequency is caused to run through the electrode(s) 11 and/or 12. In accordance with the laws of physics (e.g., Maxwell's Equations), the passing of the AC through the conductors 11, 12 causes electromagnetic fields to be generated. The electromagnetic fields generated by the AC passing through the conductive structure 11, 12 propagate through the glass substrate 1 and encompass and/or reach an exterior surface 10 of the window and can be absorbed by ice 18 thereby causing the ice 18 to melt and/or be removed from the window. Stated another way, once the de-icing circuit is driven with AC, electromagnetic energy from the circuit is coupled to ice 18 on the exterior surface of the window. This electromagnetic energy is absorbed by the ice 18 thereby causing ice removal from the window via melting and/or delamination.

In certain example embodiments of this invention, the ice-removal structure allows the impedance of the circuit to be tuned so that only, or substantially only, when ice 18 is present the circuit becomes lossy and dissipates energy to the ice; but otherwise the circuit resonates. Thus, the circuit may be termed an ice-induced lossy circuit which is not significantly lossy when ice 18 is not present on the exterior surface of the window. This is advantageous in that power consumption may be made more efficient.

In certain example embodiments, it has been found that an AC frequency from the power source 15 tuned to ice removal is from about 5-40 kHz, more preferably from about 10-25 kHz, and most preferably from about 10-20 kHz. It has surprisingly been found that the use of AC at this frequency causes generation of electromagnetic energy that is most efficiently absorbed by ice 18 on the exterior surface 10 of the window, thereby resulting in the most efficient ice removal. A sine wave and/or square wave type of AC may be used in different example embodiments of this invention. In certain example embodiments, a pulsing technique used may be the so called chirping mode whereby a sinusoidal wave is modulated by square pulses. In certain example embodiments, it has also been found that application of such AC at about 300-500 V is particularly effective at ice removal.

In certain example embodiments of this invention, the grid may be formed by first depositing a continuous conductive layer of Ag, Cr, Au, ITO, or the like on the glass substrate 1. The conductive layer can then be laser scribed into the two conductors 11 and 12 with a spatial frequency such that line widths (i.e., the width of comb teeth 11b and/or 12b) may be no larger than about 200 μm, more preferably no larger than about 100 μm, in certain example embodiments. Such a gridded system would be difficult to be seen by the naked eye and may even appear transparent to a vehicle operator or one exterior the vehicle. In certain example embodiments, the spacing "S" between adjacent approximately parallel conductive grid members 11b and 12b may be from about 100 to 800 μm, more preferably from about 100 to 500 μm, and sometimes from about 125 to 250 μm.

Figure 3:
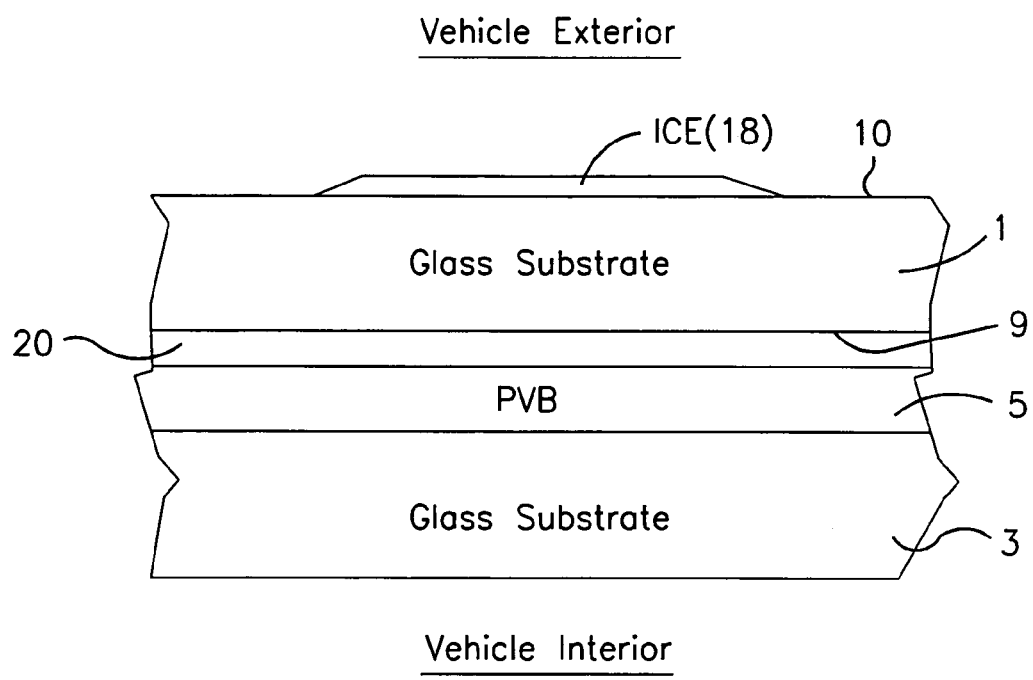
FIG. 3 is a cross sectional view of a window according to another example embodiment of this invention.

FIG. 3 is a cross sectional view of a window (e.g., windshield) according to another example embodiment of this invention, having a de-icing structure and circuit. The FIG. 3 embodiment is the same as the FIG. 1-2 embodiment discussed above, except that the grid G of the FIG. 1-2 embodiment is replaced in the FIG. 3 embodiment with a continuous conductive sheet or blanket 20 of a transparent conductive oxide such as indium tin oxide (ITO) or the like. A transparent silver or silver based coating could also be used as the heating conductive coating 20 in alternative example embodiments of this invention. In certain example instances, the conductive coating 20 may be a silver based IR reflecting layer of a low-E coating. The same AC at the frequency discussed above is used and applied to the transparent conductive coating 20. In certain example embodiments, the AC is applied across the conductive coating 20 using a pair of bus bars or the like. Heat and/or electromagnetic waves resulting from the AC passing through conductive coating 20 propagate through glass substrate 1 and is/are absorbed by ice 18 thereby causing the ice to melt and/or delaminate from the window structure.

Figure 4:
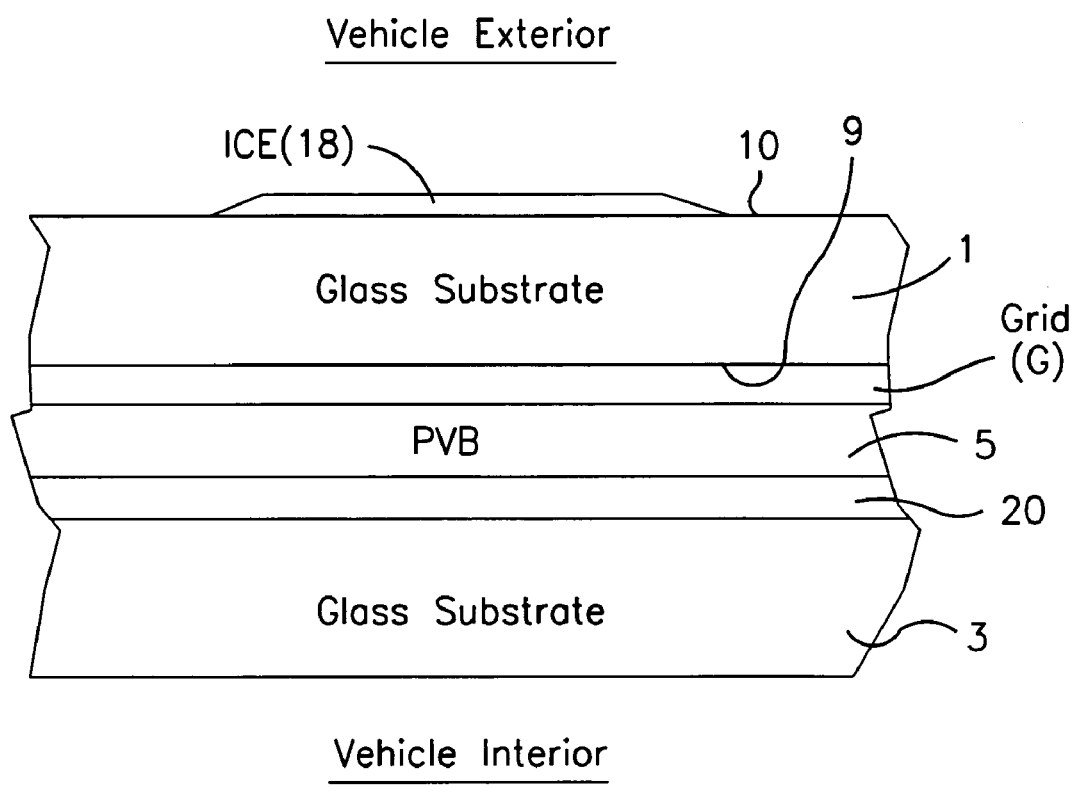
FIG. 4 is a cross sectional view of a window according to another example embodiment of this invention.

FIG. 4 is a cross sectional view of a window (e.g., windshield) according to another example embodiment of this invention, having a de-icing structure and circuit. The FIG. 4 embodiment is the same as the FIG. 1-2 embodiment discussed above, except that an additional continuous conductive sheet or blanket 20 of a transparent conductive oxide such as indium tin oxide (ITO) or the like is provided on the interior surface of the other glass substrate 3. Also, in the FIG. 4 embodiment, the grid G is made up of one conductor and not two spaced apart combs. AC is applied so that one terminal of the AC power source 15 is electrically connected to grid 6 (of a single electrically connected conductor—not two spaced apart combs in this example embodiment) and the other terminal of the power source 15 is electrically connected to the conductive coating 20. Thus, the two conductors 6 and 20 are provided on different planes, and on opposite sides of the PVB layer 5. When this circuit is driven, electromagnetic energy is caused to couple with ice 18 on the exterior surface of substrate 1. Again, this technique allows the impedance of the circuit to be tuned so that only when ice is present then the circuit becomes lossy and dissipates energy to the ice 18, and otherwise the circuit resonates in certain example embodiments of this invention. In certain alternatives of the FIG. 4 embodiments, both conductors 6 and 20 may be of the continuous coating type (e.g., of ITO or Ag).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of de-icing a vehicle window, the window comprising an exterior substrate and an interior substrate that are laminated to one another via at least an interlayer, the method comprising:
   providing at least one conductor on an interior surface of the exterior substrate, wherein the conductor comprises a coating of a transparent conductor extending across a substantial portion of the window; and
   applying AC at a frequency of from about 5 to 40 kHz to the conductor on the interior surface of the exterior substrate, so that electromagnetic energy caused by application of the AC to the conductor propagates through the exterior substrate and is absorbed by ice on an exterior surface of the vehicle window thereby causing the ice to melt and/or be removed from the vehicle window.

2. The method of claim 1, wherein the AC is applied at a frequency of from about 10 to 25 kHz.

3. The method of claim 1, wherein the AC is applied at a frequency of from about 10 to 20 kHz.

4. The method of claim 1, wherein the conductor comprises silver and/or indium tin oxide.

5. The method of claim 1, wherein the AC is applied to the conductor on the interior surface of the exterior substrate, and is also applied to a conductor on a surface of the interior substrate.

6. The method of claim 1, wherein at least one of the substrates is of glass.

7. The method of claim 1, wherein a de-icing circuit comprises the conductor and at least one AC power source, and wherein impedance of the circuit is tuned so that when ice is present then the circuit becomes lossy and dissipates energy to the ice, and otherwise the circuit resonates.

8. A system for de-icing a vehicle window, the window comprising an exterior substrate and an interior substrate that are laminated to one another via at least an interlayer, the system comprising:
   at least one conductor on an interior surface of the exterior substrate, wherein the conductor comprises a coating of a transparent conductor extending across a substantial portion of the window; and
   a circuit for applying AC at a frequency of from about 5 to 40 kHz to the conductor on the interior surface of the exterior substrate, so that electromagnetic energy caused by application of the AC to the conductor propagates through the exterior substrate and is absorbed by ice on an exterior surface of the vehicle window thereby causing ice to melt and/or be removed from the vehicle window.

9. The system of claim 8, wherein the AC is applied at a frequency of from about 10 to 25 kHz.

10. The system of claim 8, wherein the AC is applied at a frequency of from about 10 to 20 kHz.

11. The system of claim 8, wherein the conductor comprises silver and/or indium tin oxide.

12. The system of claim 8, wherein the AC is applied to the conductor on the interior surface of the exterior substrate, and is also applied to a conductor on a surface of the interior substrate.

13. The system of claim 8, wherein at least one of the substrates is of glass.

14. The system of claim 8, wherein the circuit comprises the conductor and at least one AC power source, and wherein impedance of the circuit is tuned so that when ice is present then the circuit becomes lossy and dissipates energy to the ice, and otherwise the circuit resonates.

\* \* \* \* \*